(12) United States Patent
Kojima et al.

(10) Patent No.: US 6,883,398 B2
(45) Date of Patent: Apr. 26, 2005

(54) PEDAL DEVICE FOR A VEHICLE AND AUTOMOBILE USING THE SAME

(75) Inventors: Takao Kojima, Tokyo (JP); Toshimichi Minowa, Tokyo (JP); Satoru Kuragaki, Tokyo (JP); Kazuhiko Satou, Tokyo (JP); Tokuji Yoshikawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 09/922,917

(22) Filed: Aug. 7, 2001

(65) Prior Publication Data

US 2002/0020247 A1 Feb. 21, 2002

(30) Foreign Application Priority Data

Aug. 9, 2000 (JP) ......................................... 2000-241625

(51) Int. Cl.[7] .................................................. G05G 1/14
(52) U.S. Cl. ............................................. 74/564; 74/514
(58) Field of Search .......................... 74/512, 513, 514, 74/560, 561, 564; 244/235

(56) References Cited

U.S. PATENT DOCUMENTS

| | | | | |
|---|---|---|---|---|
| 1,120,460 A | | 12/1914 | Dunlap et al. | |
| 1,403,443 A | * | 1/1922 | Paul | 74/513 |
| 1,516,862 A | * | 11/1924 | Loury | 74/564 |
| 1,613,237 A | * | 1/1927 | Meyer | 74/564 |
| 2,464,327 A | * | 3/1949 | Mack | 477/213 |
| 3,426,615 A | * | 2/1969 | Strauss | 74/513 |
| 4,802,381 A | * | 2/1989 | Lo | 74/513 |
| 5,927,419 A | * | 7/1999 | Tokimoto | 180/170 |
| 6,324,457 B1 | * | 11/2001 | Minowa et al. | 701/70 |

FOREIGN PATENT DOCUMENTS

| | | |
|---|---|---|
| EP | 0909687 A1 | 4/1999 |
| GB | 452606 | 8/1936 |
| JP | 04-038600 | 2/1992 |

* cited by examiner

*Primary Examiner*—Chong H. Kim
(74) *Attorney, Agent, or Firm*—Crowell & Moring LLP

(57) ABSTRACT

Pedal device 10 has a pedal member 11 depressed by the driver, and arm member 12 engaged with the pedal member, for turning when the pedal member is depressed, and transmitting driver's force-on-pedal to the brake master cylinder. When the driver's force-on-pedal which acts on pedal member 11 is less than the fixed value, footrest means 13 restricts the turning of the arm member. Pedal member 11 is composed of footplate 11a to be depressed by the driver, and protruding portion 11b engaged with the footplate, on which driver's heel can be put.

4 Claims, 9 Drawing Sheets

PEDAL DEVICE FOR A VEHICLE AND AUTOMOBILE USING THE SAME

BACKGROUND OF THE INVENTION

The present invention relates to a pedal device for a vehicle and an automobile using the same, particularly to a pedal device of a vehicle suitable for the use in the vehicle having an automatic cruise control where the driver does not need the accelerator operation and an automobile using the same.

Recently, a self-control system is being developed, in which the speed of automobile can be controlled to become a preset speed of automobile, for example, like following distance control automatic cruise (ACC: Adaptive Cruise Control), and an engine, a motor, a transmission, and a brake is self-controlled so as to keep the safe following distance by detecting the distance between this car and the preceding car with radar. In this case, only the start and acceleration are controlled automatically and the stop and deceleration are controlled based on driver's will to improve safety more. As the method for that, the deceleration and the stop are controlled by operating only brake pedal of a present braking system, and the start and acceleration is controlled automatically.

Here, as described in the Japanese Patent Application Laid-Open No. 4-38600, the start and stop of a vehicle is carried out by one pedal running, in which only brake operation is performed when set in a slow acceleration running mode under the traffic jam.

However, according to the apparatus disclosed in the Japanese Patent Application Laid-Open No. 4-38600, only the usage of so-called on/off type can be effective, in which the deceleration and stop are carried out by the operation of the brake pedal, and the start and acceleration are carried out by releasing the brake pedal. Therefore, it is required for the driver to wait to do a rapid deceleration to avoid the risk with keeping the foot from the brake pedal. Therefore, the driver's workload is very large.

Then, the applicant proposed a new apparatus in the Japanese Patent Application Laid-Open No. 2000-56050, in which a brake pedal device has the footrest function to put the foot on in usual and to work the brake by stepping on the brake pedal harder than usually.

However, because brake pedal used in the method previously proposed is one being used in general, brake operation is performed around the heel put on the floor face. Therefore, a first problem is that it is impossible to depress strongly the brake pedal when the rapid braking is required.

Further, there is a second problem in this apparatus. Namely, in a brake pedal with the footrest function that the force-on-pedal less than the fixed value does not generate the braking force even if the foot is put on the pedal, the usability is deteriorated dependently on the driver because necessary footrest force is different according to an individual driver when the force-on-pedal set point is fixed.

SUMMARY OF THE INVENTION

An object of the present invention is to provide a pedal device of a vehicle where brake pedal can be strongly depressed when the rapid braking is required and an automobile using the same.

(1) To achieve the above-mentioned object, the present invention adopts the following configuration.

A pedal device for a vehicle having a pedal member depressed by the driver, and arm member engaged with the pedal member, for turning when the pedal member is depressed, and transmitting driver's force-on-pedal to the brake master cylinder, further comprising;

a footrest means for restricting the turning of the arm member when the driver's force-on-pedal which acts on pedal member is less than the fixed value, and wherein said pedal member is composed of footplate to be depressed by the driver, and protruding portion engaged with the footplate, on which driver's heel can be put.

According to such configuration, the brake pedal can be strongly depressed when the rapid braking also is required compared with brake operation in which the brake operation is performed around the heel put on the floor face, because brake pedal can be depressed by the bending and stretching movement.

(2) The following configuration is adopted desirably in above-mentioned (1).

The heel putting part is a protruding portion fixed to the bottom of the footplate.

(3) The following configuration is adopted desirably in above-mentioned (1).

The heel putting part is a sliding portion supported rotatably at the bottom of the footplate, which can slide on the floor face of the vehicle.

(4) The following configuration is adopted desirably in above-mentioned (1).

The pedal member is supported rotatably with respect to the arm member, and the arm member has the stopper which restricts the movement of the pedal member.

According to such configuration, the flexibility can be given to the bending angle of driver's ankle, and the tiredness of the driver can be reduced.

(5) The following configuration is adopted desirably in above-mentioned (1).

The pedal device further includes;

a force-on-pedal detection means arranged in said footplate, for detecting driver's force-on-pedal, a foot load detection means arranged on said heel putting portion, for detecting driver's foot load, and a footrest force calculation means for controlling said footrest means based on at least one output of said foot load detection means and said force-on-pedal detection means.

According to such configuration, a slight adjustment of braking force can be done.

(6) The following configuration is adopted desirably in above-mentioned (5).

The footrest force calculation means calculates the footrest force from the driver's force-on-pedal of the driver detected by the force-on-pedal detection means and foot load detected by the foot load detection means, and adjusts suitable footrest force for an individual driver automatically.

According to such configuration, suitable footrest forces for an individual driver can be obtained.

(7) The following configuration of claim 4 is adopted desirably in above-mentioned (1).

The pedal device further includes;

a buffer means for generating the torque to resist the turning of the arm means when the pedal means is depressed, and wherein the footrest force calculation means controls the buffer means when releasing the restriction of the turning of the arm member by the footrest means, and adjusts the force-on-pedal applied on the pedal member.

According to such configuration, the impact on the driver at a moment shifted from the state of footrest to the state of brake operation can be reduced, and the rapid braking which the driver does not intend can be prevented.

(8) Further, to achieve the above-mentioned object, the present invention adopts the following configuration.

An automobile using the pedal device for a vehicle having a pedal member depressed by the driver, and arm member engaged with the pedal member, for turning when the pedal member is depressed, and transmitting driver's force-on-pedal to the brake master cylinder, further comprising a footrest means for restricting the turning of the arm member when the driver's force-on-pedal which acts on pedal member is less than the fixed value, and wherein the pedal member is composed of footplate to be depressed by the driver, and protruding portion engaged with the footplate, on which driver's heel can be put.

According to such configuration, the work load to the driver is reduced under the condition that the driver must put the foot on brake pedal for a long time such as the running on the downward slope when jamming, the running by the creep when jamming, and the state of footrest to put the foot on brake pedal while operating the automatic running device.

DETAILED DESCRIPTION OF THE PREFERRED EMBODIMENTS

Figure 1:
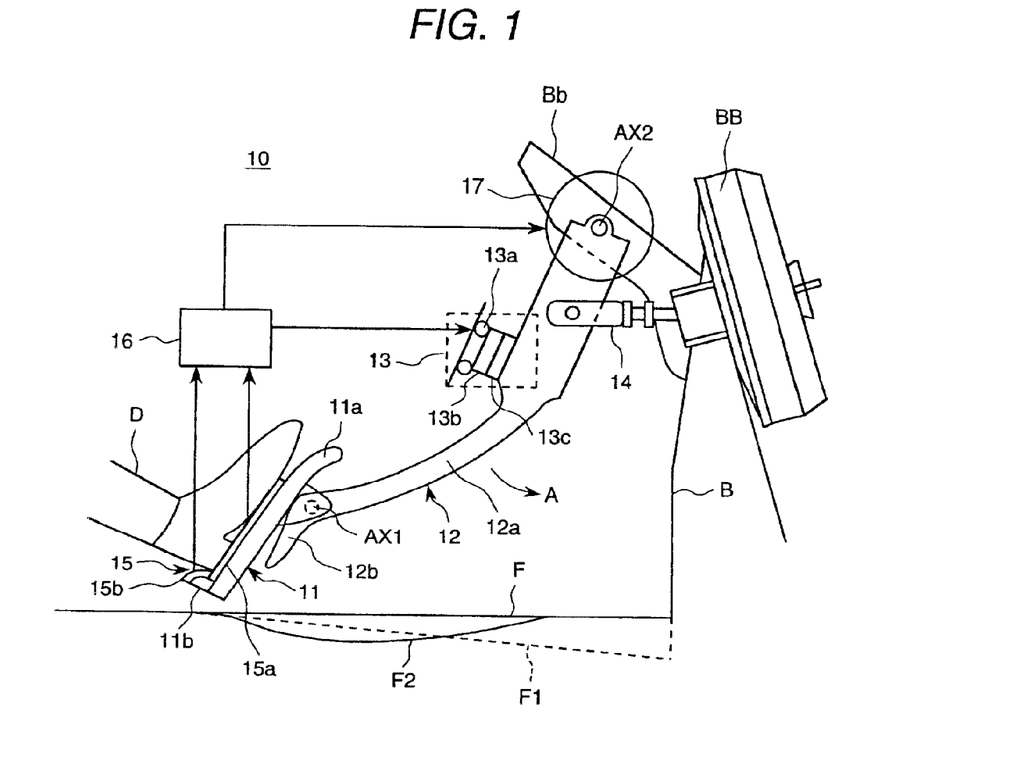
FIG. 1 is a system configuration view showing the configuration of the pedal device of the vehicle according to the first embodiment of the present invention.

Hereafter, the configuration of the pedal device of the vehicle according to a first embodiment of the present invention and its operation are explained with reference to FIG. 1 through FIG. 6. First, the configuration of the pedal device of the vehicle according to this embodiment is explained with reference to FIG. 1. FIG. 1 is a system configuration view showing the configuration of the pedal device of the vehicle according to the first embodiment of the present invention.

Brake pedal unit 10 includes pedal member 11, arm member 12, footrest means 13, brake rod 14, detection means 15, footrest force calculation means 16, and buffer means 17.

Pedal member 11 is composed of footplate member 11a on which driver D applies the force-on-pedal and protruding portion 11b which is a heel putting part for driver D to put the heel. Arm member 12 is composed of arm part 12a, and stopper 12b to restrict the movement of the pedal member 11. The pedal member 11 is supported rotatably with arm member 12 by axis AX1. The angle of pedal member 11 changes according to the bending angle of driver D's ankle. Arm member 12 is supported rotatably with brake bracket Bb by axis AX2.

Footrest means 13 maintains arm member 12 in the initial position with driver D not having the will to brake, and the driver's foot put on pedal member 11a while putting the heel on protruding portion 11b. footrest means 13 uses a solenoid as an actuator having the function of footrest. Footrest means 13 is composed of coil 13a, stator 13b, and movable element 13c, and installed in body B of the vehicle. Here, electromagnetic force is generated when energizing coil 13a, and movable element 13c is attracted to stator 13b.

Pedal member 11 does not move even if the driver naturally puts the foot on pedal member 11 because movable element 13c is connected or integrated with arm member 12, and thus the brake is never depressed. That is, pedal member 11 has the function of the footrest. When the energizing (current-carrying) to coil 13a is intercepted, movable element 13c becomes movable. When pedal member 11 is depressed under such a condition, the movement is transmitted to brake booster BB through arm member 12 and brake rod 14.

The force-on-pedal is transmitted to brake master cylinder (not shown) through brake booster 16 according to the amount of the movement of arm member 12, and the brake operates.

Detection means 15 is composed of force-on-pedal detection means 15a installed in pedal member 11a and foot load detection means 15b installed in protruding portion 11b. Force-on-pedal detection means 15a detects the force-on-pedal when driver D steps on pedal member 11a, and, for instance, the pressure sensor is used. Foot load detection means 15b detects the foot load when driver D's foot is put on protruding portion 11b, and, for instance, the pressure sensor is used.

Footrest force calculation means 16 controls the amount of energizing of coil 13a to allow footrest means 13 to be a state of footrest based on the force-on-pedal detected by detection means 15, and controls footrest means 13 so as to intercept the energizing to the coil when driver D applies the brake by using the force more than a fixed force-on-pedal.

Here, the footrest function of the pedal device of the vehicle according to this embodiment is explained with reference to FIGS. 2 and 3. These figures are explanatory views of the footrest function of the pedal device of the vehicle according to the first embodiment of the present invention.

Driver D's force-on-pedal and foot load are different in each driver. Then, footrest force calculation means 16 self-adjusts the footrest force by footrest means 13 according to the force-on-pedal and foot load of each driver.

Figure 2:
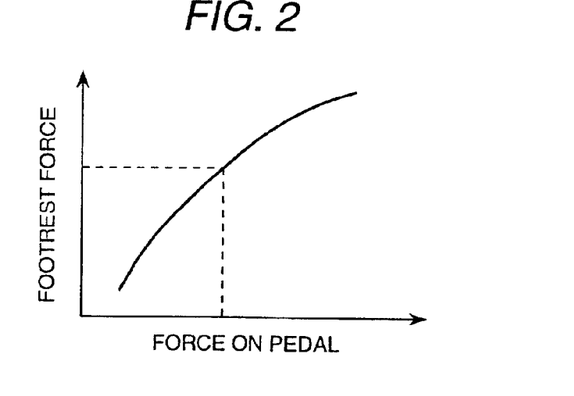
FIG. 2 is an explanatory view of the footrest function of the pedal device of the vehicle according to the first embodiment of the present invention.

FIG. 2 shows the relation between the force-on-pedal and the footrest force. As shown, footrest force calculation means 16 increases the amount of the energizing to coil 13a so that the footrest force may increase by increasing of the force-on-pedal.

Figure 3:
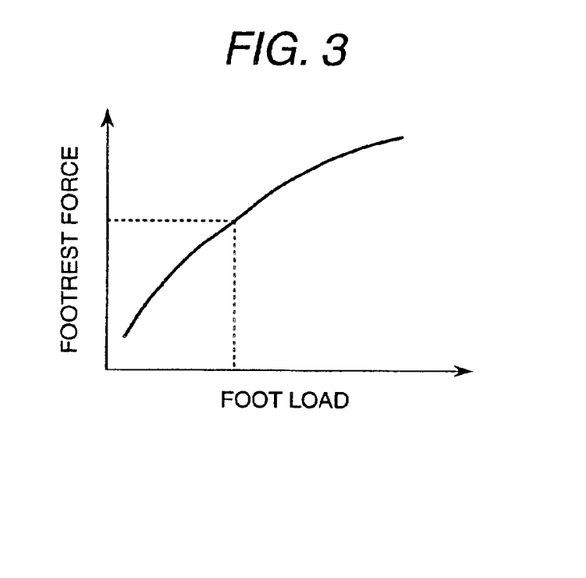
FIG. 3 is an explanatory view of the footrest function of the pedal device of the vehicle according to the first embodiment of the present invention.

Further, FIG. 3 shows the relation between the foot load and the footrest force. Footrest force calculation means 16 increases the amount of the energizing to coil 13a so that the footrest force may increase by increasing of foot load.

Footrest force calculation means 16 calculates the amount of the energizing of coil 13a, in order to obtain the necessary footrest force for driver D's footrest from the relation between the output of force-on-pedal detection means 15a and the footrest force as shown in FIG. 2 and the relation between the output of foot load detection means 15b and the footrest force as shown in FIG. 3. Further, driver's braking-will is perceived when the force-on-pedal becomes more than the predetermined value, and the energizing to coil 13a is intercepted.

Footrest force calculation means 16 is provided with a means for correcting the footrest force calculated after driver D gets on, based on the result obtained by automatically calculating suitable footrest force for driver D after this driver D gets on, and analyzing driver's characteristic of operation from the habit etc. of the pedal operation of driver D while running. Since the footrest force is calculated by footrest force calculation means 16 from driver's force-on-pedal and foot load, and the best footrest force for an individual driver is automatically adjusted, it is not required that the footrest force is adjusted whenever the driver takes the place.

As described above, when the force-on-pedal is less than fixed value, footrest means 13 according to this embodiment maintains arm member 12 in the initial position. When more than the force-on-pedal corresponding to a fixed position is applied, arm member 12 is released from the restriction of footrest means 13, and arm member 12 becomes possible to move according to driver D's force-on-pedal. As a result, usual brake operation becomes possible.

The brake operation may be carried out based on not only the force-on-pedal but also application of foot load.

Therefore, brake pedal can be used as footrest when driver D puts the foot on brake pedal with the force-on-pedal below a fixed value by footrest means 13, and it is possible to do continuously brake operation without changing the pedal to be stepped. As a result, the characteristic of the footrest is improved.

Figure 4:
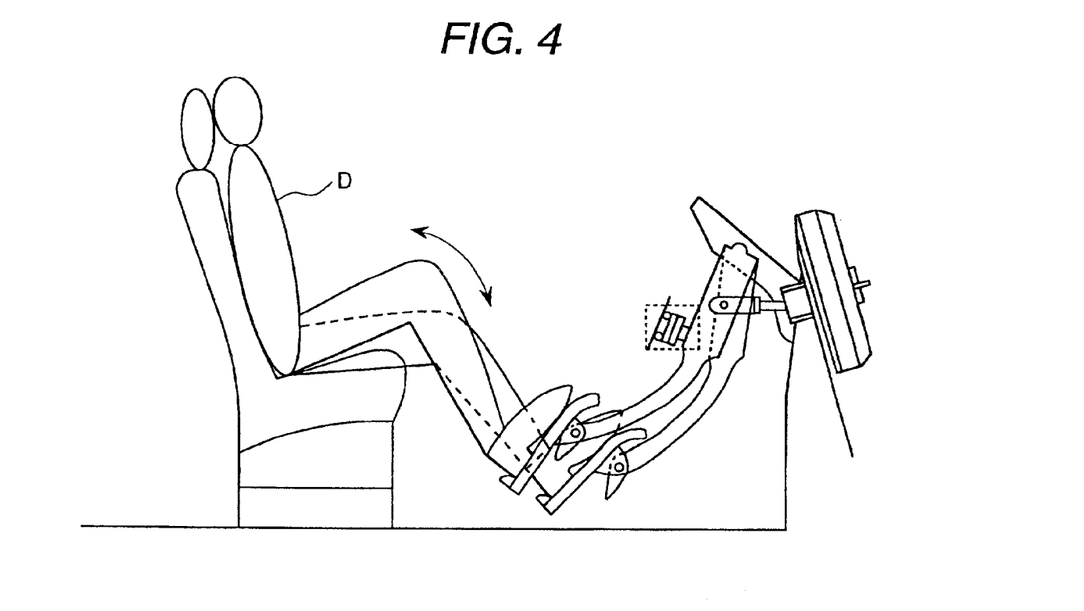
FIG. 4 is an explanatory view of the braking operation of the pedal device of the vehicle according to the first embodiment of the present invention.

Further, because brake member 11 is provided with protruding portion 11b for driver D to put the heel besides footplate member 11a to which driver D applies the force-on-pedal, driver D can put the foot on pedal member 11 in the state of footrest. Therefore, because driver D can brake by operation in which the driver's knee is extended, as shown in FIG. 4, when braking, it is possible to do stronger breaking, compared with the conventional brake operation by the bend of the ankle.

Especially, braking distance can be shortened in the emergency, and the safety improves.

In addition, the angle of pedal member 11 can change according to the bending angle of driver D's ankle. Therefore, because it is possible to depress the pedal with pushing the heel out at brake operation while reducing the load at footrest to driver D, compared with the one that its angle is fixed, it is possible to depress the pedal strongly without forcing an excessive load on the ankle.

A conventional stroke can be secured because brake pedal is maintained in the initial position when using the brake pedal as a footrest, and a slight adjustment of braking force is easy.

Next, referring to FIG. 1. In this example, buffer means 17 is composed of the motor with rotation axis on the same axis as axis AX2 on which brake pedal bracket Bb installed in body B of the vehicle and arm member 12 are mounted. When the motor which is buffer means 17 is energized, and the motor is rotated, the torque to resist the movement of arm 12 in a turning direction (the direction of arrow A in figure).

Here, the operation of buffer means 17 is explained with reference to FIG. 5.

Figure 5:
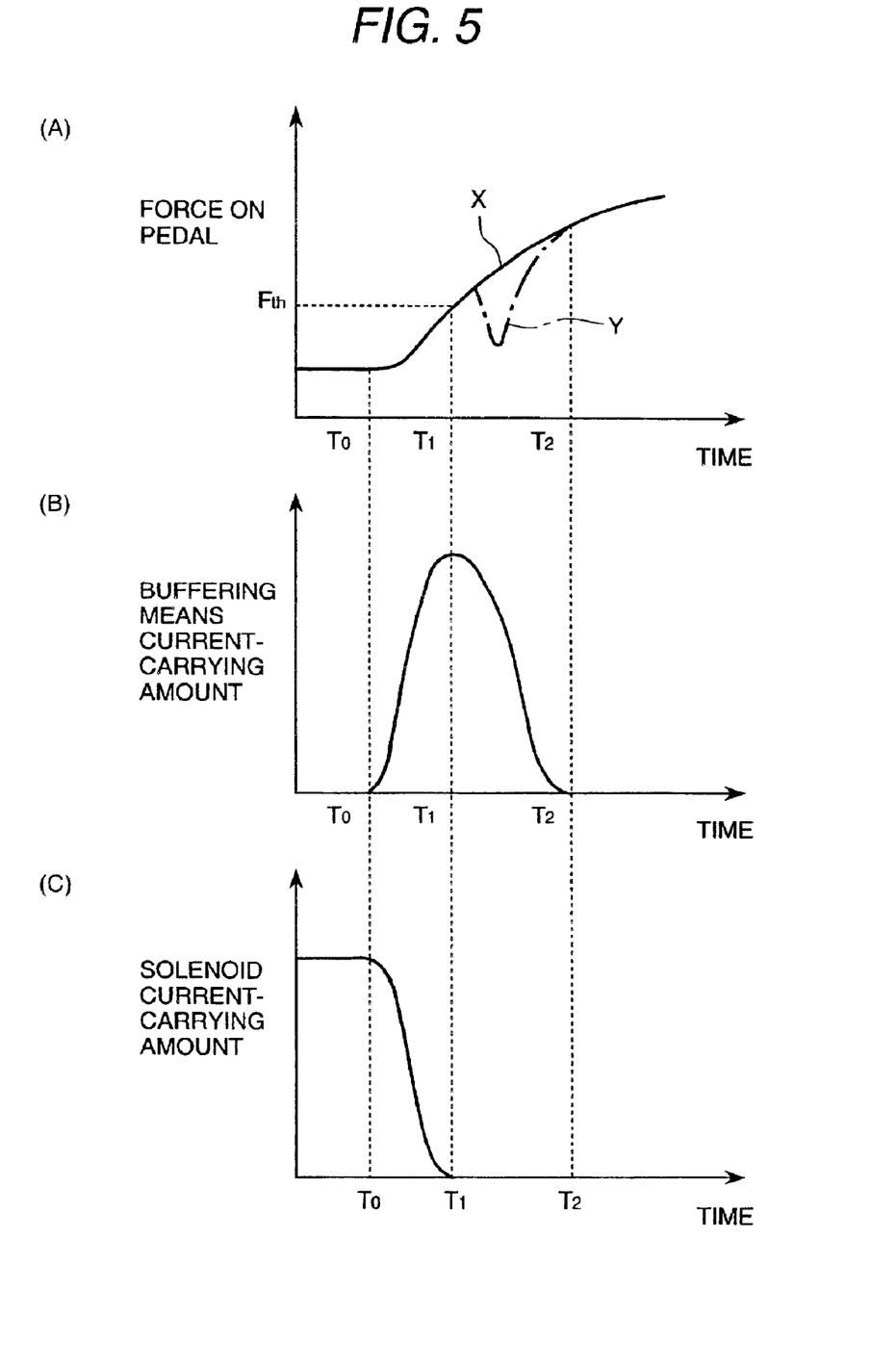
FIG. 5 is an explanatory view of the operation of the buffer means in the pedal device of the vehicle according to the first embodiment of the present invention.

FIG. 5 is an explanatory view of the operation of the buffer means in the pedal device of the vehicle according to the first embodiment of the present invention. The ordinate of FIG. 5(A) shows driver's force-on-pedal. Further, the ordinate of FIG. 5(B) shows the amount of energizing to buffer means 17. FIG. 5(C) shows the amount of energizing to footrest means 13 of the solenoid type. The abscissa of each figure shows time.

It is in a state of footrest before time T0. Under such a condition, footrest force calculation means 16 calculates the necessary footrest force based on the foot load and the force-on-pedal shown in FIGS. 2 and 3, and energizes footrest means 13 for generating this footrest, as shown in FIG. 5(C). Further, buffer means 17 is not energized at this time, as shown in FIG. 5(B).

The force-on-pedal increases as shown in FIG. 5(A) when the brake is depressed so that the driver may brake at time T0. At the same time, footrest force calculation means 16 gradually decreases the amount of energizing to footrest means 13 as shown in FIG. 5(C), and gradually increases the amount of energizing to buffer means 17 as shown in FIG. 5(B). As a result, the torque of the motor which is buffer means 17 is generated so as to resist the movement of arm member 12 in a turning direction of arrow A.

Then, footrest force calculation means 16 gradually decreases the amount of energizing to buffer means 17 as shown in FIG. 5(B) when the amount of energizing to footrest means 13 becomes 0 at time T1 as shown in FIG. 5(C). As a result, the force-on-pedal increases gradually according to the depressing of pedal member 11 by driver's braking operation as shown in FIG. 5(A) by solid line X.

Here, the impact on the driver is generated, because the force-on-pedal rapidly gets depressed after the energizing to footrest means 13 becomes 0 at time T1 as shown in FIG. 5(A) by alternate long and short dash line Y unless buffer means 17 is provided.

On the other hand, the sense of discomfort of brake operation caused by the driver can be canceled by using the buffer means and the operability of the brake can be improved. Further, the rapid braking when the energizing to the footrest means is intercepted can be prevented, and the safety can be improved.

In the example shown in FIG. 1, there is a possibility that floor face F of flat form and pedal member 11 comes in contact depending on the installation position etc. of pedal member 11 and arm member 12. For such a case, in order to avoid the contact, the floor face can be inclined toward forward as shown by broken line F1, and contact on pedal member 11 and the floor face be made so as to have a hollow of the curved shape which curves as shown by alternate long and short dash line F2.

Figure 6:
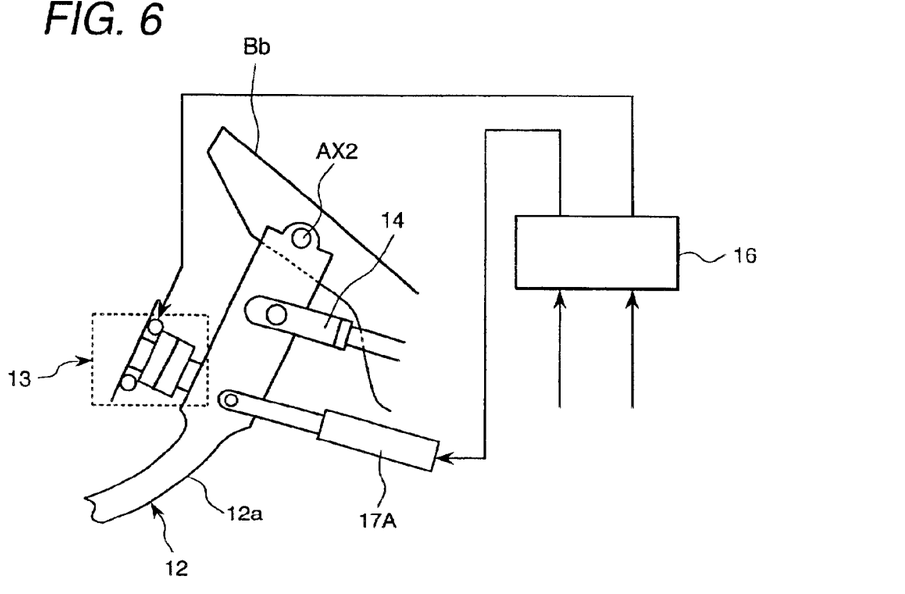
FIG. 6 is a configuration view showing another configuration of the buffer means used for the pedal device of the vehicle according to the first embodiment of the present invention.

Next, another example of the buffer means is explained with reference to FIG. 6. FIG. 6 is a configuration view showing another configuration of the buffer means used in the pedal device of the vehicle according to the first embodiment of the present invention. FIG. 6 shows only the main part of FIG. 1. Further, the same sign as FIG. 1 designates the same part.

An oil pressure buffer or pneumatic one is used as the buffer means 17A in this example. The buffer means 17A has been installed in arm member 12. The buffer means 17A eases the impact to the driver when the electromagnets are separated by the output of footrest force calculation means 16.

As described above, when the force-on-pedal is less than fixed value, arm member is maintained in the initial position. When more than the force-on-pedal corresponding to a fixed position is applied, usual brake operation becomes possible. Therefore, brake pedal can be used as footrest, and it is possible to do continuously brake operation without changing the pedal to be stepped. As a result, the characteristic of the footrest is improved.

Further, because brake member is provided with protruding portion for driver D to put the heel, driver D can put the foot on pedal member in the state of footrest. Therefore, because driver D can brake by operation in which the driver's knee is extended, when braking, it is possible to do stronger breaking. Especially, braking distance can be shortened in the emergency, and the safety improves.

In addition, the angle of pedal member can change according to the bending angle of driver D's ankle. Therefore, because it is possible to depress the pedal with pushing the heel out at brake operation while reducing the load at footrest to driver D, it is possible to depress the pedal strongly without forcing an excessive load on the ankle.

Further, the sense of discomfort of brake operation caused by the driver can be canceled by using the buffer means, and the operability of the brake can be improved. In addition, the rapid braking when the energizing to the footrest means is intercepted can be prevented, and the safety can be improved.

Figure 7:
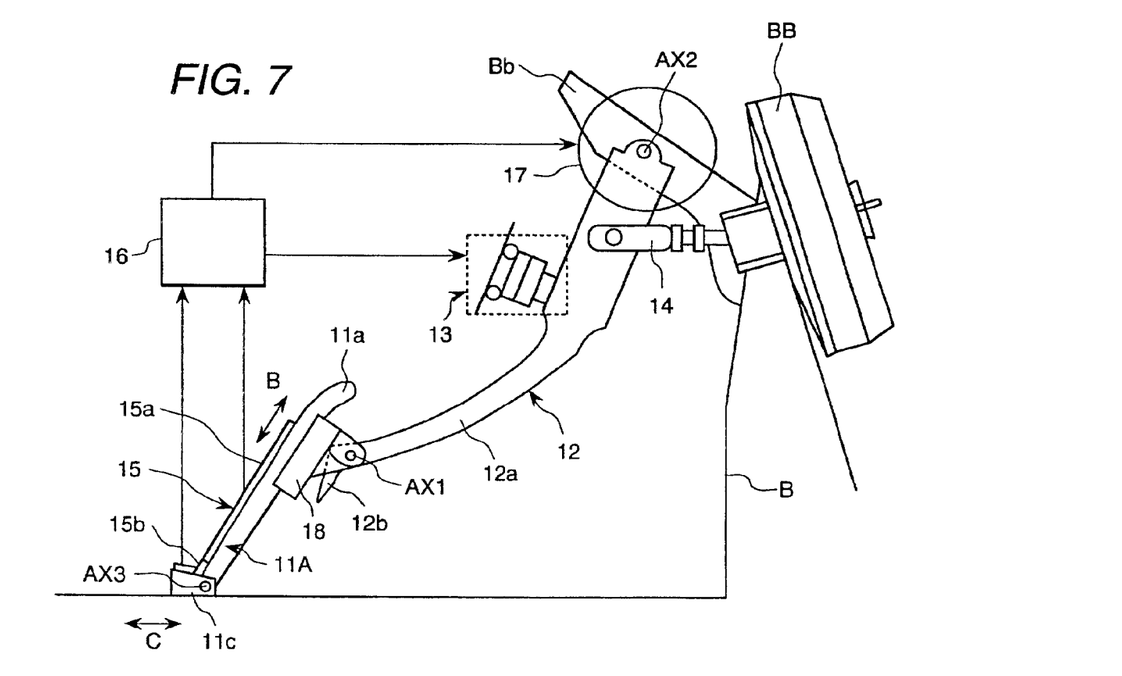
FIG. 7 is a system configuration view showing the configuration of the pedal device of the vehicle according to the second embodiment of the present invention.

Next, the configuration of the pedal device of the vehicle according to the second embodiment of the present invention and its operation are explained with reference to FIGS. 7–10. First, the configuration of the pedal device of the vehicle according to this embodiment is explained with reference to FIG. 7. FIG. 7 is a system configuration view showing the configuration of the pedal device of the vehicle according to the second embodiment of the present invention. The same sign as FIG. 1 designates the same part.

In this embodiment, the pedal member 11A is composed of footplate member 11a on which driver D applies the force-on-pedal, and slide member 11c or a heel putting part on which driver D can put the heel and which can slide on the floor face. The slide member 11c can slide on the floor face in a direction of arrow C. The slide member 11c is mounted on footplate 11a so as to rotate about axis AX3. Further, the pedal member 11A is fixed to arm member 12 so as to slide along guide member 18 in a direction of arrow B. The guide member 18 is supported rotatably with arm member 12 by axis AX1.

Also in this embodiment, when the force-on-pedal is less than fixed value, footrest means 13 maintains arm member 12 in the initial position. When more than the force-on-pedal corresponding to a fixed position is applied, arm member 12 is released from the restriction of footrest means 13.

Further, footplate member 11a moves according to the manipulated variable when driver D applies the force-on-pedal on the pedal member 11A, and working with footplate member 11a, slide member 11c moves on the floor face.

In addition, guide member 18 is fixed so as to rotate half about axis AX1 of arm member 12, and can be moved relatively with respect to footplate member 11a. Therefore, the angle of footplate member 11a changes according to the bending angle of driver D's ankle.

When the force-on-pedal is less than fixed value, footrest means 13 according to this embodiment maintains arm member 12 in the initial position. When more than the force-on-pedal corresponding to a fixed position is applied, arm member 12 is released from the restriction of footrest means 13, and arm member 12 becomes possible to move according to driver D's force-on-pedal. As a result, usual brake operation becomes possible. Therefore, brake pedal can be used as footrest when driver D puts the foot on brake pedal with the force-on-pedal below a fixed value by footrest means 13, and it is possible to do continuously brake operation without changing the pedal to be stepped. As a result, the characteristic of the footrest is improved.

Further, the sense of discomfort of brake operation caused by the driver can be canceled by using the buffer means, and the operability of the brake can be improved. In addition, the rapid braking when the energizing to the footrest means is intercepted can be prevented, and the safety can be improved.

Figure 8:
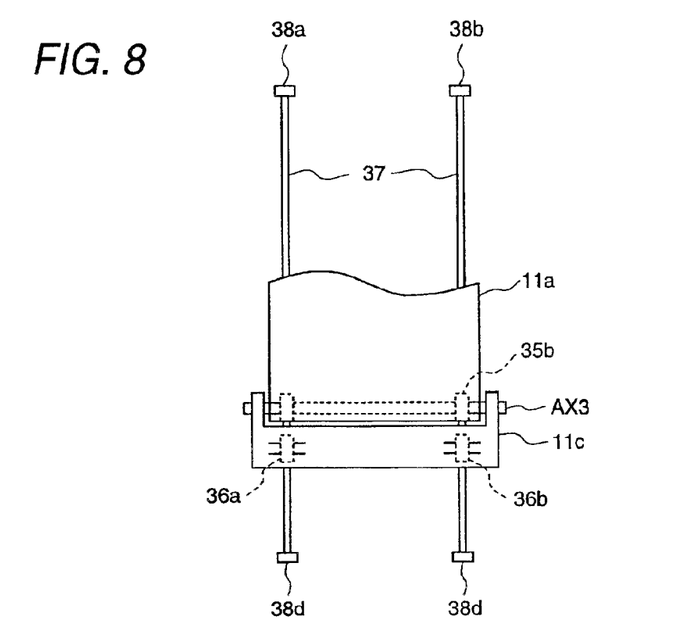
FIG. 8 is a plan view showing the configuration of the pedal member used for the pedal device of the vehicle according to the second embodiment of the present invention.
Figure 9:
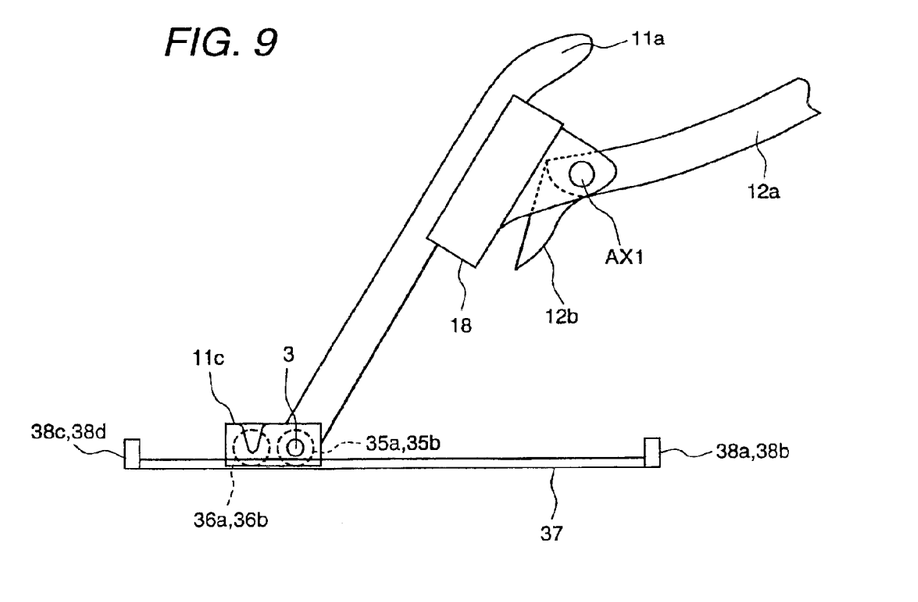
FIG. 9 is a side elevation of the configuration shown in FIG. 8.

Next, the sliding mechanism of the pedal member 11A is explained with reference to FIGS. 8 and 9. FIG. 8 is a plan view showing the configuration of the pedal member used for the pedal device of the vehicle according to the second embodiment of the present invention. Further, FIG. 9 is side elevation of FIG. 8. In FIG. 8, the same sign as FIG. 7 shows the same part.

Slide member 11c is provided with rotatable support wheels 36a and 36b. Further, wheel 35a and 35b are provided in axis AX3. On the other hand, rail member 37, and wheel stoppers 38a, 38b, 38c and 38d are mounted on the floor face.

Wheels 35a, 35b, 36a and 36b are engaged with rail 37, and they are rotatable on rail 37. As a result, slide member 11c can slide to the floor face.

Next, another sliding mechanism of the pedal member 11A is explained with reference to FIG. 10.

Figure 10:
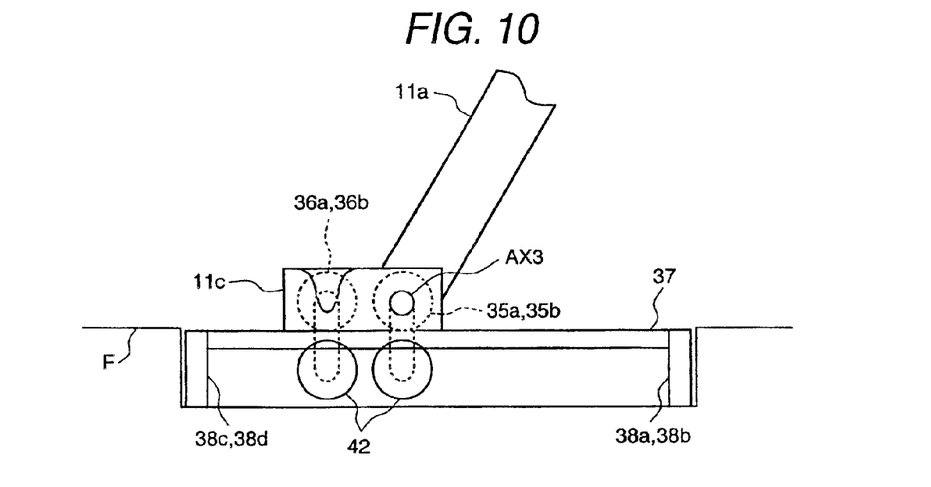
FIG. 10 is a side elevation showing other configurations of the pedal member used for the pedal device of the vehicle according to the second embodiment of the present invention.

FIG. 10 is a side elevation showing another configuration of the pedal member used for the pedal device of the vehicle according to the second embodiment of the present invention. The same sign as FIG. 8 designates the same part.

This example has supplementary wheel 42 in addition to the configuration shown in FIG. 8. Rail 37 is sandwiched between wheel 35 and support wheel 36, and supplementary wheel 42, and thus the wheels can be prevented to run off.

Further, the height of rail 37 is equalized to the height of the floor face by providing the concave part on floor face F and arranging rail 38 in this concave part. As a result, there is no obstacle in the drive of the driver.

As described above, when the force-on-pedal is less than fixed value, arm member is maintained in the initial position. When more than the force-on-pedal corresponding to a fixed position is applied, usual brake operation becomes possible.

Therefore, brake pedal can be used as footrest, and it is possible to do continuously brake operation without changing the pedal to be stepped. As a result, the characteristic of the footrest is improved.

Further, because brake member is provided with protruding portion for driver D to put the heel, driver D can put the foot on pedal member in the state of footrest.

Therefore, because driver D can brake by operation in which the driver's knee is extended, when braking, it is possible to do stronger breaking. Especially, braking distance can be shortened in the emergency, and the safety improves.

In addition, the angle of pedal member can change according to the bending angle of driver D's ankle.

Therefore, because it is possible to depress the pedal with pushing the heel out at brake operation while reducing the load at footrest to driver D, it is possible to depress the pedal strongly without forcing an excessive load on the ankle.

Further, the sense of discomfort of brake operation caused by the driver can be canceled by using the buffer means, and the operability of the brake can be improved. In addition, the rapid braking when the energizing to the footrest means is intercepted can be prevented, and the safety can be improved.

Next, the configuration of the pedal device of the vehicle according to the third embodiment of the present invention and its operation are explained with reference to FIGS. 11–13. The configuration of the pedal device of the vehicle according to this embodiment is similar to one shown in FIG. 7. First, the sliding mechanism of the pedal member 11A is explained with reference to FIGS. 11 and 12.

Figure 11:
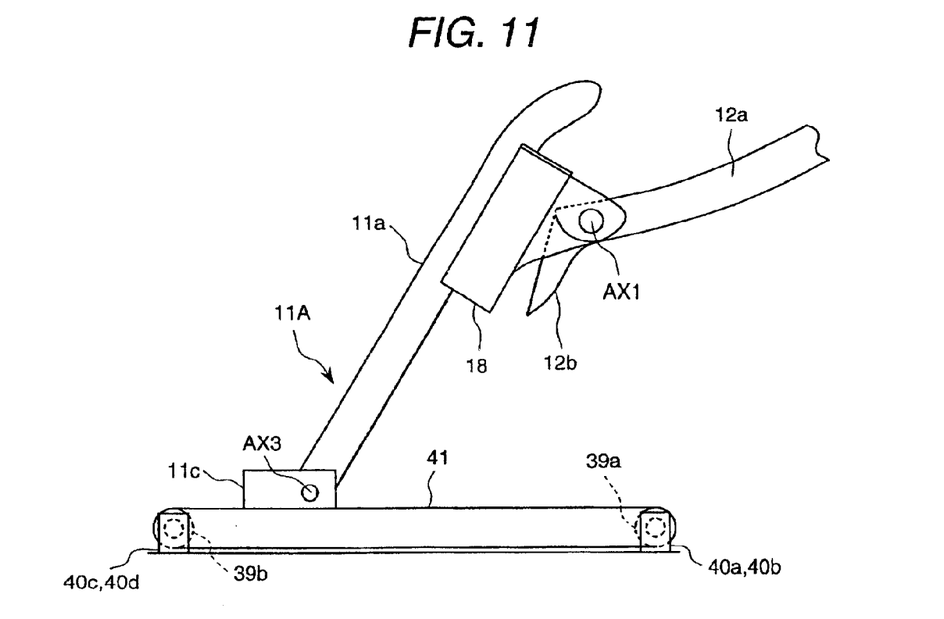
FIG. 11 is a side elevation showing the configuration of the pedal member used for the pedal device of the vehicle according to the third embodiment of the present invention.
Figure 12:
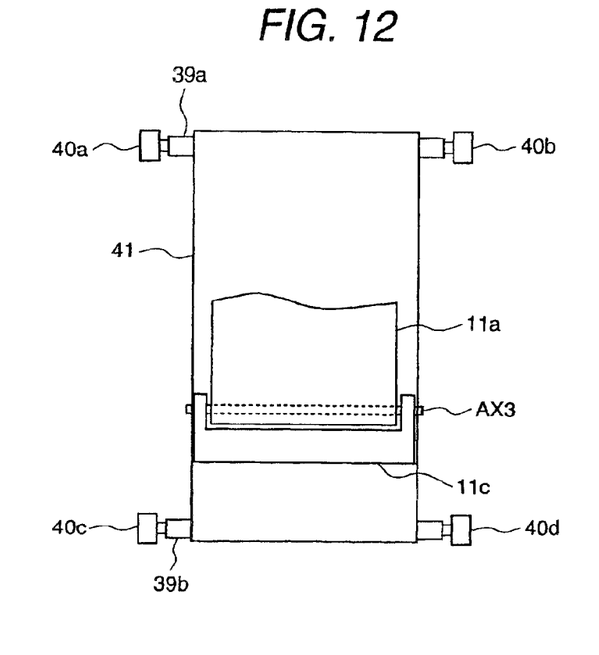
FIG. 12 is a plan view of the configuration shown in FIG. 11.

FIG. 11 is a side elevation showing the configuration of the pedal member used for the pedal device of the vehicle according to the third embodiment of the present invention. FIG. 12 is a plan view of the configuration shown in FIG. 11. In FIGS. 11 and 12, the same sign as FIGS. 7 and 8 designates the same part.

Roller support members 40a, 40b, 40c and 40c to support rollers 39a, 39b, and belt member 41 are provided on the floor face. Slide member 11c is fixed to a part of belt member 41. Slide member 11c smoothly moves on the floor face because belt member 41 operates with the movement of slide member 11c.

Next, another sliding mechanism of the pedal member 11A is explained with reference to FIG. 13.

Figure 13:
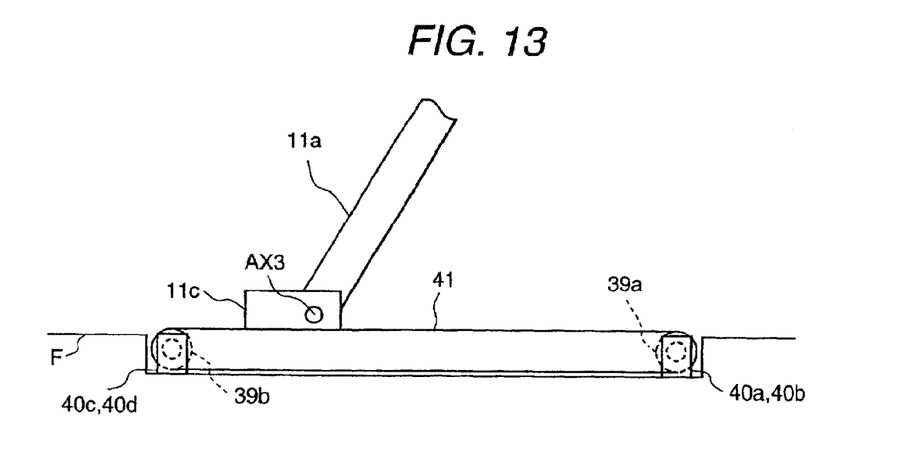
FIG. 13 is a side elevation showing another configuration of the pedal member used for the pedal device of the vehicle according to the third embodiment of the present invention.

FIG. 13 is a side elevation showing another configuration of the pedal member used for the pedal device of the vehicle according to the third embodiment of the present invention. In FIG. 13, the same sign as FIG. 11 designates the same part.

In addition to the configuration shown in FIG. 11, the height of belt member 41 is equalized to the height of the floor face by providing the concave part on floor face F and arranging belt member 41 in this concave part. As a result, there is no obstacle in the drive of the driver.

As described above, when the force-on-pedal is less than fixed value, arm member is maintained in the initial position. When more than the force-on-pedal corresponding to a fixed position is applied, usual brake operation becomes possible.

Therefore, brake pedal can be used as footrest, and it is possible to do continuously brake operation without changing the pedal to be stepped. As a result, the characteristic of the footrest is improved.

Further, because brake member is provided with protruding portion for driver D to put the heel, driver D can put the foot on pedal member in the state of footrest. Therefore, because driver D can brake by operation in which the driver's knee is extended, when braking, it is possible to do stronger breaking. Especially, braking distance can be shortened in the emergency, and the safety improves.

In addition, the angle of pedal member can change according to the bending angle of driver D's ankle. Therefore, because it is possible to depress the pedal with pushing the heel out at brake operation while reducing the load at footrest to driver D, it is possible to depress the pedal strongly without forcing an excessive load on the ankle.

Further, the sense of discomfort of brake operation caused by the driver can be canceled by using the buffer means, and the operability of the brake can be improved. Further, the rapid braking when the energizing to the footrest means is intercepted can be prevented, and the safety can be improved.

Figure 14:
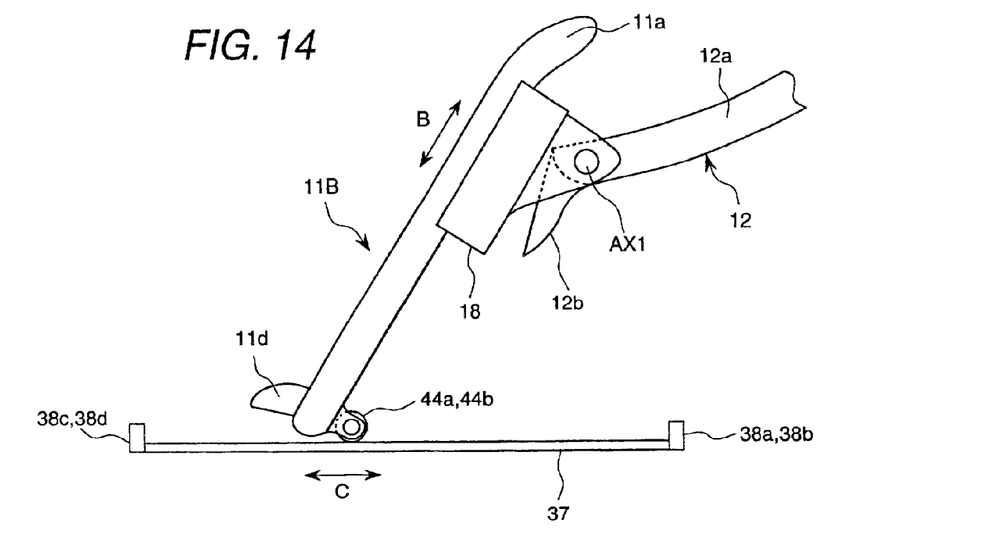
FIG. 14 is a side elevation showing the configuration of the pedal member used for the pedal device of the vehicle according to the fourth embodiment of the present invention.

Next, the configuration of the sliding mechanism of the pedal member 11A used for the pedal device of the vehicle according to the fourth embodiment of the present invention is explained with reference to FIG. 14. The whole configuration of the pedal device of the vehicle according to this embodiment is similar to one shown in FIG. 7. FIG. 14 is a side elevation showing the configuration of the pedal member used for the pedal device of the vehicle according to the fourth embodiment of the present invention. In FIG. 14, the same sign as FIG. 9 designates the same part.

In this embodiment, Pedal member 11 is composed of footplate member 11a on which driver D applies the force-on-pedal and protruding member 11d on which driver D puts the heel and which is slidable on the floor face. Protruding member 11d is provided with rotatable support wheels 44a and 44b, and can slide on the floor face in a direction of arrow C. Protruding portion member 11d is fixed to footplate 11a. Further, pedal member 11B can slide along guide member 18 mounted on arm member 12 in a direction of arrow B. Guide member 18 is supported rotatably to arm member 12 by axis AX1.

Rail member 37, and wheel stoppers 38a, 38b, 38c and 38d are provided on the floor face. support wheels 44a and 44b are engaged with rail 37, and they can move on rail 37. As a result, protruding member 11d can slide on the floor face. The configuration in which the rail is sandwiched between the support wheels and supplementary wheels may be adopted as explained with reference to FIG. 13.

As described above, when the force-on-pedal is less than fixed value, arm member is maintained in the initial position. When more than the force-on-pedal corresponding to a fixed position is applied, usual brake operation becomes possible. Therefore, brake pedal can be used as footrest, and it is possible to do continuously brake operation without changing the pedal to be stepped. As a result, the characteristic of the footrest is improved.

Further, because brake member is provided with protruding portion for driver D to put the heel, driver D can put the foot on pedal member in the state of footrest. Therefore, because driver D can brake by operation in which the driver's knee is extended, when braking, it is possible to do stronger breaking. Especially, braking distance can be shortened in the emergency, and the safety improves.

In addition, the angle of pedal member can change according to the bending angle of driver D's ankle. Therefore, because it is possible to depress the pedal with pushing the heel out at brake operation while reducing the load at footrest to driver D, it is possible to depress the pedal strongly without forcing an excessive load on the ankle.

Further, the sense of discomfort of brake operation caused by the driver can be canceled by using the buffer means, and the operability of the brake can be improved. Further, the rapid braking when the energizing to the footrest means is intercepted can be prevented, and the safety can be improved.

Figure 15:
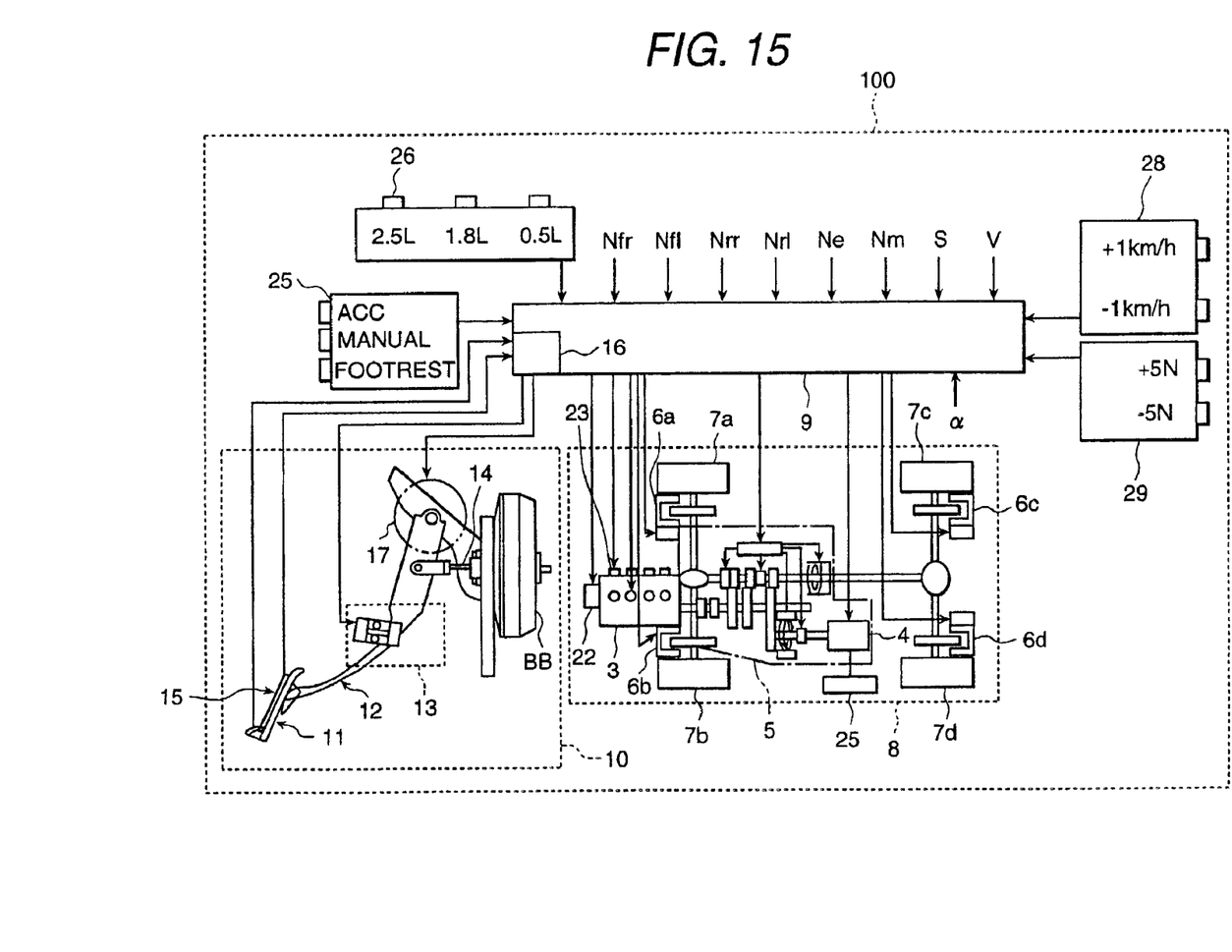
FIG. 15 is a block diagram showing the configuration of the automobile equipped with the pedal device of the vehicle according to another embodiment of the present invention.
Figure 16:
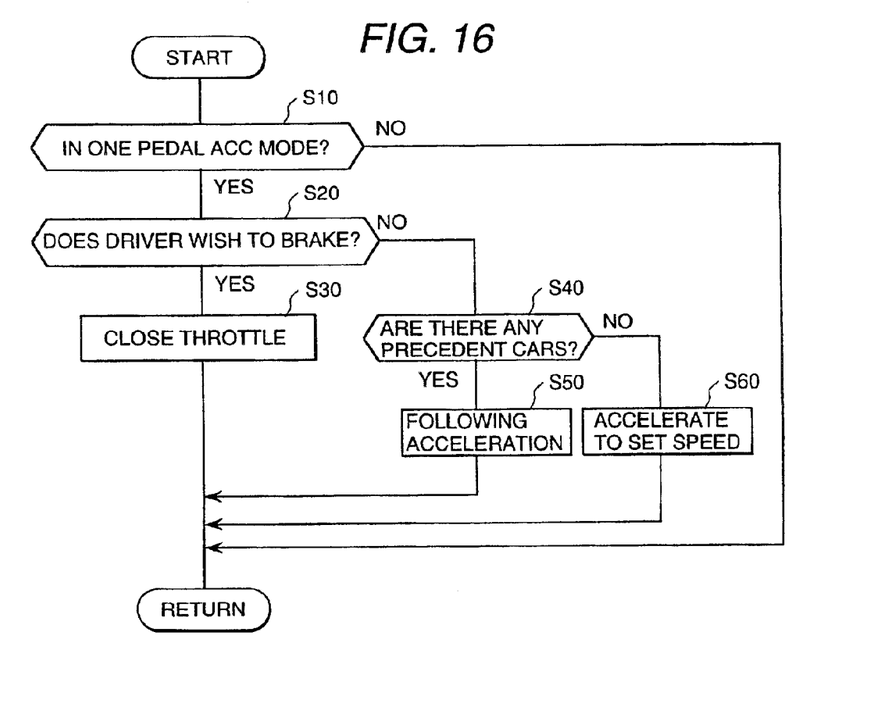
FIG. 16 is a flow chart showing a driving mode according to another embodiment of the present invention.

Next, the configuration of the vehicle equipped with the pedal device of the vehicle according to another embodiment of the present invention and its operation are explained with reference to FIGS. 15 and 16. FIG. 15 is a block diagram showing the configuration of the vehicle equipped with the pedal device of the vehicle according to another embodiment of the present invention. FIG. 16 is a flow chart showing the operation mode of the automobile according to this embodiment. The same sign as FIG. 1 designates the same part in these figures.

The configuration of pedal device 10 of the vehicle according to this embodiment is similar to one shown in FIG. 1. This configuration can be similarly applied to the pedal device shown in FIG. 6, FIG. 7, FIG. 11, or FIG. 14.

Pedal device 10 including solenoid type footrest means 13 and buffer means 17, engine 3, and transmission 5 including motor 4, for braking drive system 8 having brake device 6a, . . . , 6d and tire 7a, . . . , 7d, and control system 9 for controlling braking drive system 8 according to input information are installed in automobile 100. Motor 4 is driven by the electric power supplied from battery 25.

Control system 9 communicates through the network among engine 3, transmission 5, control unit (not shown) for controlling the brake device 6, control unit (not shown) for managing the whole braking drive system 8, and footrest force calculation means 16 for controlling footrest means 13 and buffer means 17.

Further, the control system 9 inputs information on detection means 15, information on running mode set switch 25 and driving force (acceleration) set switch 26, information α from the sensor of the manipulated variable of the accelerator pedal, information Nfr from right front wheel rotation sensors, information Nfl from left front wheel rotation sensors, information Nrr from right rear wheel rotation sensors, information Nrl from left front wheel rotation sensors, engine revolution speed information Ne, motor revolution speed information Nm, The distance S between the automobile and the previous automobile and relative velocity Vr of the automobile to the previous automobile obtained from the radar system (not shown), etc., and signals from speed set switches 28 by which the driver can voluntarily set the speed of the target and footrest force correction switches 29, etc.

Control system 9 controls Engine 3, transmission 5, and brake device 6 on the basis of these input signals, and thus the acceleration, the deceleration, the start, the stop and the fixed velocity running of the vehicle are executed. The footrest force is presumed by control system 9 including footrest force calculation means 16 based on the information from detection means 15 at this time, and reflected to the amount of the energizing of solenoid type footrest means 13 and buffer means 17. The operation of footrest means 13 can be turned on or turned off by the footrest button of running mode set switch 25.

The engine includes electronically controlled throttle 22 for controlling the amount of intake air, fuel injection valve 23 for supplying the amount of the fuel which corresponds to the intake air to obtain the target air/fuel ratio, and ignition plugs for ignite the fuel spray.

Next, the method of controlling the automobile according to this embodiment is explained with reference to FIG. 16.

In step s10, control system 9 judges whether it is in one pedal ACC mode. Here, there are an ACC button and a manual button besides the footrest button of running mode set switch 25 as shown in FIG. 15. If the footrest button is pushed, It is determined that control system 9 is in one pedal ACC mode. In the one pedal ACC mode, after the footrest function of pedal device 10 operates, for example, by pedal device 10 shown in FIG. 1, the ACC (Adaptive Cruise Control or following distance automatic cruise control) operates. When the ACC button is pushed, ACC operation is carried out, and when the manual button is pushed, the usual running is done. If it is in the one pedal ACC mode, the processing advances to step s20, otherwise, the control in this embodiment is ended.

For one pedal ACC mode, Control system 9 judges the presence of driver's braking-will in step s20. The presence of the braking-will is judged by footrest force calculation means 16, based on the driver's force-on-pedal and/or foot load which are the output of detection means 15. If the driver has the braking-will, the processing advances to step s30, otherwise, the processing advances to step s40.

When there is driver's braking-will, control system 9 controls electronically controlled throttle 22, and shuts the throttle valve in step s30.

When there is no driver's braking-will, the control system 9 judges the presence of the preceding automobile in step s40, based on relative velocity Vr of the automobile to the preceding automobile and the distance S between two automobiles obtained from the radar system etc. If there is a preceding automobile, the processing advances to step s50, and otherwise, the processing advances to step s60.

Control system 9 carries out the follow acceleration in step s50 according to the distance between two automobiles when there is a preceding automobile.

Further, control system 9 accelerates in step s60 according to driver's set speed of automobile when there is no preceding automobile.

In automobile 100 like the above-mentioned, the driver can control the deceleration and acceleration of the vehicle only by the brake operation without replacing the foot to step the accelerator pedal in the one pedal ACC mode. As a result, the tiredness under the drive is reduced. Further, it is possible to step promptly and strongly on the brake pedal in the emergency because the driver always put the foot on brake pedal, and the safety is improved.

What is claimed is:

1. A pedal device for a vehicle comprising a pedal member depressed by the driver, and arm member engaged with the pedal member, for turning when the pedal member is depressed, and transmitting driver's force-on-pedal to the brake master cylinder, further comprising:

a footrest configured to restrict the turning of the arm member when the force-on-pedal which acts on pedal member is less than a predetermined value, and     wherein said pedal member is composed of footplate to be depressed by the driver and a protruding portion engaged with the footplate on which a driver's heel can be put, wherein said pedal member is supported rotatably with respect to said arm member, and said arm member has the stopper which restricts the movement of said pedal member.

2. A pedal device for a vehicle comprising a pedal member depressed by the driver, and arm member engaged with the pedal member, for turning when the pedal member is depressed, and transmitting driver's force-on-pedal to the brake master cylinder, further comprising:

a footrest configured to restrict the turning of the arm member when the force-on-pedal which acts on pedal member is less than a predetermined value, and wherein said pedal member is composed of footplate to be depressed by the driver and a protruding portion engaged with the footplate on which a driver's heel can be put, further comprising a force-on-pedal detector arranged in said footplate configured to detect the driver's force-on-pedal, a foot load detector arranged on said heel putting portion configured to detect a driver's foot load, and a footrest force calculated device configured to control said footrest based on at least one output of said foot load detector and said force-on-pedal detector.

3. The pedal device for a vehicle according to claim 2, wherein said footrest force calculator is arranged to calculate the footrest force from the driver's force-on-pedal of the driver detected by said force-on-pedal detection means and foot load detected by said foot load detection means, and adjusts suitable footrest force for an individual driver automatically.

4. A pedal device for a vehicle comprising a pedal member depressed by the driver, and arm member engaged with the pedal member, for turning when the pedal member is depressed, and transmitting driver's force-on-pedal to the brake master cylinder, further comprising:

a footrest configured to restrict the turning of the arm member when the force-on-pedal which acts on pedal member is less than a predetermined value, and wherein said pedal member is composed of footplate to be depressed by the driver and a protruding portion engaged with the footplate on which a driver's heel can be put, further comprising;

a buffer means for generating the torque to resist the turning of said arm means when said pedal means is depressed, and wherein said footrest force calculation means controls said buffer means when releasing the restriction of the turning of said arm member by said footrest means, and adjusts the force-on-pedal applied on said pedal member.

* * * * *